(12) United States Patent
Yamamoto

(10) Patent No.: US 11,386,651 B2
(45) Date of Patent: Jul. 12, 2022

(54) INFORMATION PROCESSING APPARATUS THAT MANAGES IMAGE CAPTURED AT SITE WHERE AGRICULTURAL CROP IS CULTIVATED, METHOD FOR CONTROLLING THE SAME, STORAGE MEDIUM, AND SYSTEM

(71) Applicant: CANON KABUSHIKI KAISHA, Tokyo (JP)

(72) Inventor: Tatsuya Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 16/721,728

(22) Filed: Dec. 19, 2019

(65) Prior Publication Data
US 2020/0210698 A1 Jul. 2, 2020

(30) Foreign Application Priority Data
Dec. 26, 2018 (JP) .............................. JP2018-242176

(51) Int. Cl.
G06T 7/00 (2017.01)
H04N 5/232 (2006.01)
G06V 20/10 (2022.01)

(52) U.S. Cl.
CPC .......... *G06V 20/188* (2022.01); *G06T 7/0002* (2013.01); *H04N 5/23222* (2013.01); *G06T 2207/30188* (2013.01)

(58) Field of Classification Search
CPC ............ H04N 5/23222; G06K 9/00657; G06T 7/0002; G06T 2207/30188; G06Q 50/02; G06Q 10/063
See application file for complete search history.

(56) References Cited

U.S. PATENT DOCUMENTS 10,255,670 B1 * 4/2019 Wu ........................ H04N 7/183
2016/0140438 A1 5/2016 Yang
(Continued)

FOREIGN PATENT DOCUMENTS

| EP | 2752808 A1 | 7/2014 |
|----|------------|--------|
| EP | 3351089 A1 | 7/2018 |
| JP | 5729476 B2 | 6/2015 |

OTHER PUBLICATIONS

Mujawar, Shaheen, et al. "A Content Based Image Retrieval System for diagnosing Agricultural Plant Diseases." International Journal of Engineering Research 3.3 (2014). (Year: 2014).*
(Continued)

*Primary Examiner* — Vu Le
*Assistant Examiner* — Tracy Mangialaschi
(74) *Attorney, Agent, or Firm* — Canon U.S.A., Inc. IP Division

(57) ABSTRACT

An information processing apparatus according to an aspect of the present invention displays a plurality of items corresponding to a plurality of kinds of predefined targets on a display device, manages a plurality of images, each in association with information regarding a position and a time at which each of the plurality of images is captured, chronologically captured by an imaging apparatus mounted on a moving object, and acquires an image containing a target corresponding to a selected item among the plurality images based on information regarding a position of the moving object or the imaging apparatus when an instruction based on a selection of any of the plurality of displayed items is input, information regarding a time at which the instruction is input, and the selected item.

20 Claims, 10 Drawing Sheets

(56) References Cited

U.S. PATENT DOCUMENTS

2016/0350336 A1    12/2016  Checka
2018/0218214 A1     8/2018  Pestun
2018/0276504 A1*    9/2018  Yamaguchi .......... G06K 9/3241

OTHER PUBLICATIONS

Bhange, Manisha, and H. A. Hingoliwala. "Smart farming: Pomegranate disease detection using image processing." Procedia Computer Science 58 (2015): 280-288. (Year: 2015).*

* cited by examiner

FIG.2

| ID | IMAGE FILE | TIME | POSITION | |
|---|---|---|---|---|
| 1 | IMG_0001.jpg | MARCH 2, 2018 10:12 13.1 | 34.98678, 138.59215 | 401 |
| 2 | IMG_0002.jpg | MARCH 2, 2018 10:12 14.1 | 34.98679, 138.59215 | |
| 3 | IMG_0003.jpg | MARCH 2, 2018 10:12 15.1 | 34.98680, 138.59215 | |
| 4 | IMG_0004.jpg | MARCH 2, 2018 10:12 16.1 | 34.98681, 138.59215 | |
| 5 | IMG_0005.jpg | MARCH 2, 2018 10:12 17.1 | 34.98682, 138.59215 | |
| 6 | IMG_0006.jpg | MARCH 2, 2018 10:12 18.1 | 34.98683, 138.59215 | |
| 7 | IMG_0007.jpg | MARCH 2, 2018 10:12 19.1 | 34.98684, 138.59215 | |
| ⋮ | ⋮ | ⋮ | ⋮ | |
| 835 | IMG_0835.jpg | MARCH 2, 2018 10:26 07.1 | 34.98778, 138.59323 | |
| 836 | IMG_0836.jpg | MARCH 2, 2018 10:26 08.1 | 34.98779, 138.59323 | |

| ID | REPORT CONTENT | TIME | POSITION | |
|---|---|---|---|---|
| 1 | EQUIPMENT FAILURE | MARCH 2, 2018 10:12 16.2 | 34.98682, 138.59215 | 501 |
| 2 | WEED | MARCH 2, 2018 10:21 14.7 | 34.98879, 138.59294 | |

| ID | REPORT CONTENT | TARGET | |
|---|---|---|---|
| 1 | EQUIPMENT FAILURE | WOODEN POLE OR IRON POLE | 601 |
| 2 | WEED | WEED | |
| 3 | DISEASE | SICK TREE, LEAF, OR CLUSTER | |

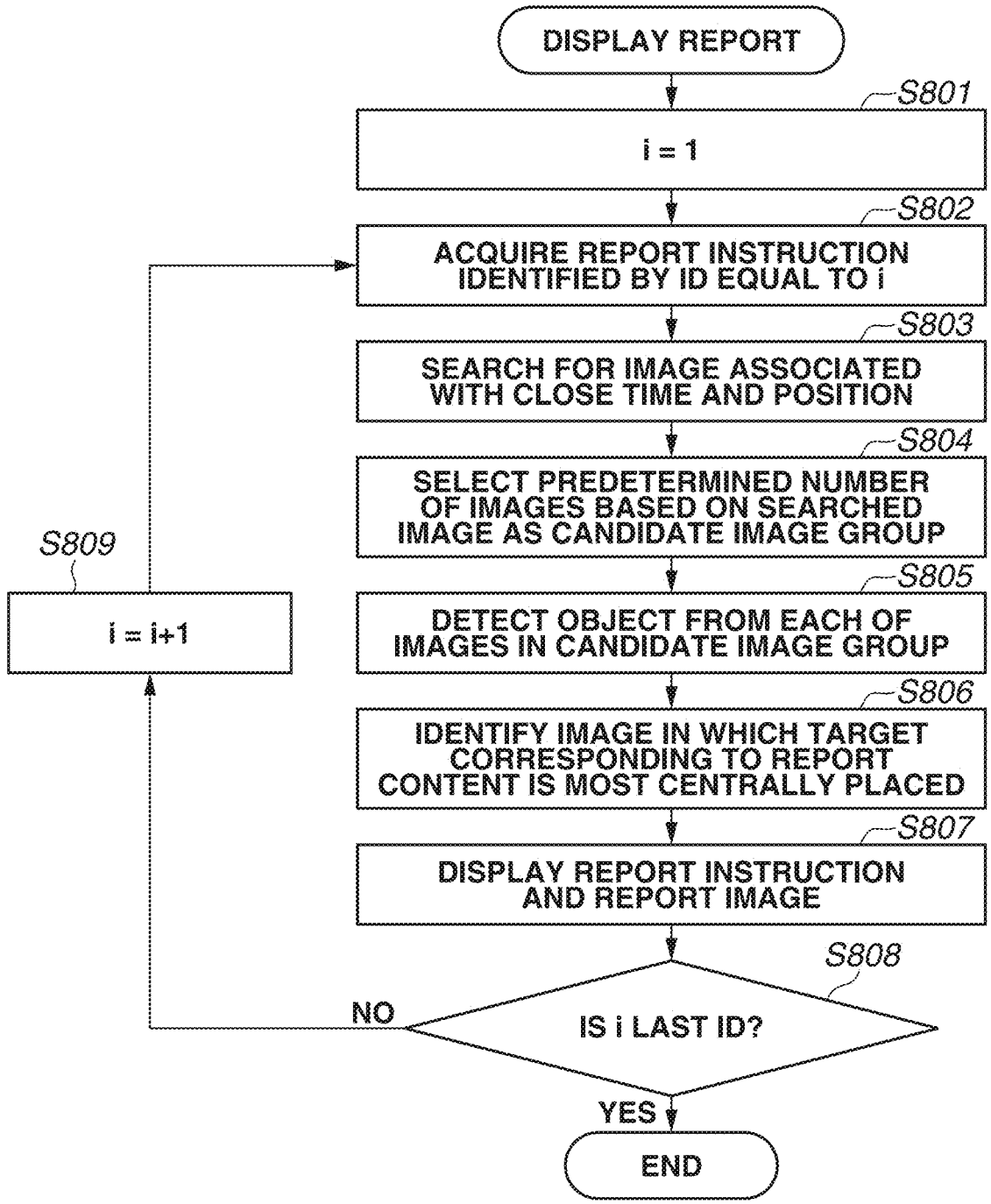

FIG.7

| ID | REPORT CONTENT | TIME | POSITION | LEFT/RIGHT DIRECTION |
|---|---|---|---|---|
| 1 | EQUIPMENT FAILURE | MARCH 2, 2018 10:12 16.2 | 34.98682, 138.59215 | LEFT SIDE |
| 2 | WEED | MARCH 2, 2018 10:21 14.7 | 34.98879, 138.59294 | RIGHT SIDE |

1201

| ID | REPORT CONTENT | TARGET | UPPER/LOWER DIRECTION |
|---|---|---|---|
| 1 | EQUIPMENT FAILURE | WOODEN POLE OR IRON POLE | UPPER SIDE |
| 2 | WEED | WEED | LOWER SIDE |
| 3 | DISEASE | SICK TREE, LEAF, OR CLUSTER | UPPER SIDE |

1301

INFORMATION PROCESSING APPARATUS THAT MANAGES IMAGE CAPTURED AT SITE WHERE AGRICULTURAL CROP IS CULTIVATED, METHOD FOR CONTROLLING THE SAME, STORAGE MEDIUM, AND SYSTEM

BACKGROUND OF THE INVENTION

Field of the Invention

The present invention relates to a technique for electronically managing a cultivation state of an agricultural crop.

Description of the Related Art

Systems exist for electronically managing the cultivation status of agricultural crops in a wide agricultural land in the agricultural industry. Methods exist for allowing a worker at the agricultural land to image a site using a camera to record a wide variety of situations occurring at the site, such as the occurrence of disease in the agricultural crop or a failure of equipment, which can be reported to the management system. In a system discussed in Japanese Patent No. 5729476, a relationship between "a purpose to take an image" and "a recommended composition of the image" is defined in advance. Then, the system receives a notification indicating the purpose input by a user from an imaging apparatus and returns information indicating the composition based on the defined relationship. The worker manipulating the imaging apparatus confirms the information indicating the composition that the imaging apparatus receives and displays, images a target in the composition according thereto, and uses it for the report.

The worker at the site engages in most agricultural work on a vehicle such as an agricultural tractor depending on a size of the agricultural land and the cultivated agricultural crop. In this case, the worker has to bear the extra work of getting off from the tractor each time to image an incident such as the emergence of weeds or a failure of equipment that the worker notices while the vehicle is running. Then, one conceivable method is to capture the image by a camera mounted on the vehicle while the vehicle is running. However, the timing at which the worker engaging in the work on the vehicle discovers the target that the worker wants to record and instructs the imaging apparatus to image it does not necessarily match the timing at which the discovered target is located within an angle of view of the camera fixed on the vehicle. On the other hand, constantly capturing images by the camera mounted on the vehicle to prevent the unintentional omission of imaging the target leads to a considerable increase in recorded images. Further, because most of these images are similar images, as a result of imaging similar sceneries, quite a lot of time and effort is taken in identifying an image containing the target discovered by the worker from the many obtained images.

Under these circumstances, the present invention is directed to providing assistance so as to achieve the acquisition with a camera, mounted on a moving object, of an image suitable to an instruction that a user issues at an arbitrary timing, to image a target.

SUMMARY OF THE INVENTION

According to an aspect of the present invention, an information processing apparatus includes a management unit configured to manage a plurality of images chronologically captured by an imaging apparatus mounted on a moving object, each in association with information regarding a time at which each of the images is captured, a display control unit configured to display a plurality of items corresponding to a plurality of kinds of predefined targets on a display device, an acquisition unit configured to, in a case where an instruction based on a selection of any of the plurality of displayed items is input, acquire a candidate image group, which is a part of the plurality of images, based on the information regarding the time at which each of the plurality of images is captured and information regarding a time at which the instruction is input, and an identification unit configured to identify an image containing a target corresponding to the selected item from the candidate image group.

Further features of the present invention will become apparent from the following description of exemplary embodiments with reference to the attached drawings.

BRIEF DESCRIPTION OF THE DRAWINGS

FIG. 2 illustrates tables indicating an example of information managed by the management system.

FIG. 4 is a flowchart illustrating an example of processing for displaying a reported image performed by the management system.

FIG. 7 are tables illustrating an example of information managed by the management system.

DESCRIPTION OF THE EMBODIMENTS

In the following description, the present invention will be described in detail based on representative exemplary embodiments thereof with reference to the attached drawings. Configurations that will be described in the following exemplary embodiments are merely one example, and the present invention shall not be limited to the illustrated configurations.

Figure 1A:
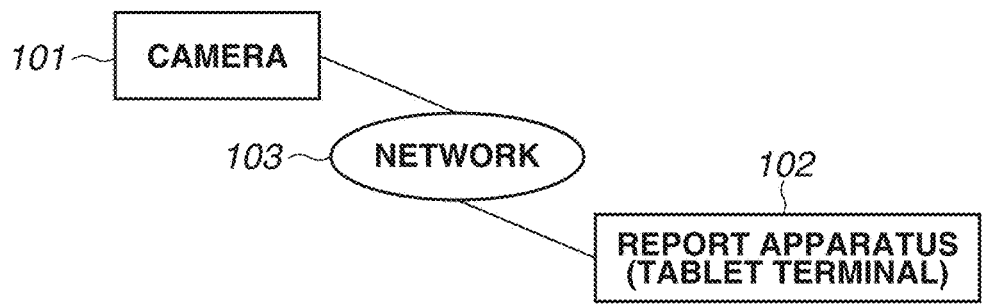
FIGS. 1A, 1B, and 1C are block diagrams illustrating an example of a configuration of a management system.

FIG. 1A is a block diagram illustrating an example of a configuration of a system according to a first exemplary embodiment. A camera 101 is a camera mounted on a vehicle, and is connected to a report apparatus 102, which is a tablet terminal mounted on the vehicle, via a network 103. Specifically, the vehicle refers to an agricultural tractor, and runs along with a predetermined operation (e.g., plowing soil, harvesting an agricultural crop, and towing another agricultural machine) in an agricultural land. However, the present exemplary embodiment can also be applied even when a small-sized truck or a passenger vehicle is used instead of the tractor. Further, for example, the present exemplary embodiment may also be applied to not only the vehicle but also another type of moving object. For example, the present exemplary embodiment can be used to allow a worker to make a report with an intuitive operation even for such work that the worker sprinkles water or sprays agricultural chemicals while manipulating, for example, a drone equipped with an imaging apparatus. In the following description, the present exemplary embodiment will be described based on the agricultural vehicle that runs in the agricultural land by way of example.

The report apparatus 102 is an information processing apparatus that controls imaging by the camera 101 by transmitting a camera control command thereto via the network 103, and acquires a captured image, an imaging time, and an imaging position. Further, the report apparatus 102 displays an operation screen for allowing the worker to report an incident that the worker notices on the vehicle, and a reported content. The worker refers to a person who actually engages in agricultural work in the agricultural land, and a user of the report apparatus 102. In the present exemplary embodiment, the same tablet terminal performs a series of processing procedures from receiving the report to displaying a result, but the system may be configured in such a manner that different terminals carries out an input of an instruction and a display of the result, respectively. Further, for example, the system may be configured in such a manner that a server apparatus that communicates with the report apparatus 102 via the network 103 is added to the configuration, and performs processing regarding management and selection of an image among processing procedures performed by the report apparatus 102 that will be described below in response to an instruction from the report apparatus 102.

Further, in the present exemplary embodiment, the report apparatus 102 will be described, by way of example, based on an information processing apparatus that the worker uses for the purpose of noticing the incident such as an equipment failure, emergence of weeds, and occurrence of a disease of the agricultural crop, and of reporting it to the management system. However, the term "report" used in the present exemplary embodiment includes not only when the worker "notifies" another person who operates the management system of the information but also when the worker "records" the information to allow the worker to, for example, review the reported content later.

Figure 1B:
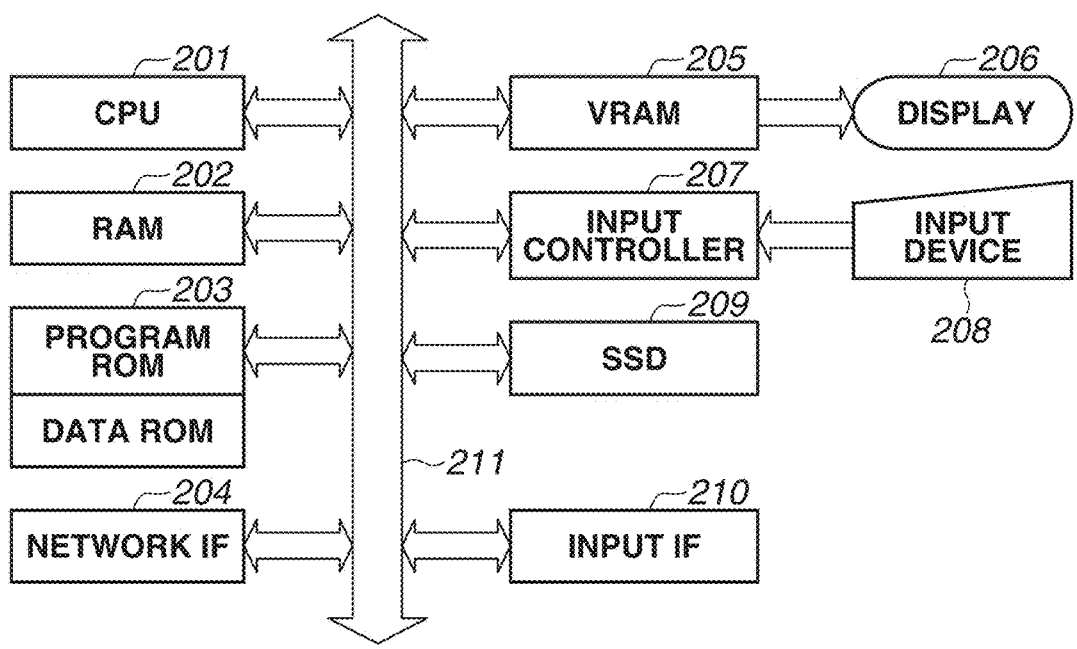

FIG. 1B is a block diagram illustrating a hardware configuration of the information processing apparatus that functions as the report apparatus 102 according to the present exemplary embodiment. A central processing unit (CPU) 201 is a central arithmetic device that comprehensively controls the entire apparatus. The CPU 201 implement operations according to the present exemplary embodiment by calculating and processing information and controlling each hardware component based on a control program. A random access memory (RAM) 202 is a general-purpose RAM, and functions as a main memory of the CPU 201 or a work memory required to load an execution program and execute the program. A read only memory (ROM) 203 is a general-purpose ROM, and stores therein, for example, a program defining a procedure for implementing the operations according to the present exemplary embodiment. The ROM 203 includes a program ROM storing therein, for example, basic software (operating system (OS)) that is a system program for controlling a device in the computer system, and a data ROM storing therein, for example, information required for the system to operate. Alternatively, a solid state drive (SSD) 209 may be used in place of the ROM 203.

A network interface (IF) 204 is a network interface, and controls an input/output of data such as the camera control command and image data transmitted and received via a network such as a local area network (LAN). The network IF 204 is configured corresponding to a medium of the network, such as a wired network and a wireless network. A video RAM (VRAM) 205 is a video RAM, and rasterizes an image to be displayed on a screen of a display 206 serving as a display device. The display 206 is a display device, and is, for example, a liquid crystal display. An input controller 207 is a controller that controls an input signal from an input device 208. The input device 208 is an external input device for receiving an operation instruction from the user, and is, for example, a touch panel, and a keyboard. The SSD 209 is a solid state drive. The SSD 209 is used to store an application program, and data such as moving image data and image data. An input IF 210 is an interface for connecting to an external device such as a memory card drive, and is used to, for example, read out image data captured by a digital camera. An input/output bus 211 is an input/output bus for communicably connecting the above-described units, and includes, for example, an address bus, a data bus, and a control bus.

Figure 1C:
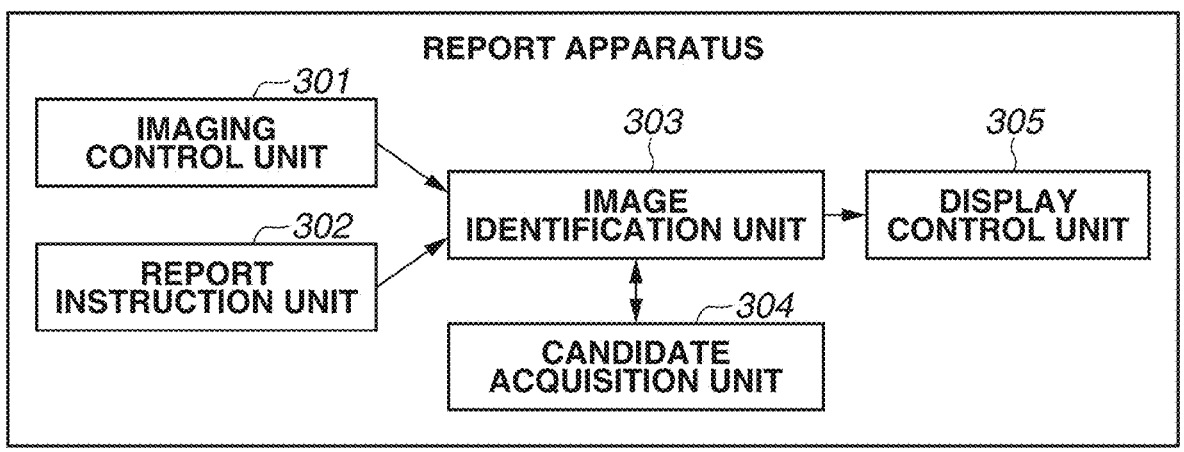

FIG. 1C is a block diagram illustrating an example of a functional configuration of the information processing apparatus that functions as the report apparatus 102 according to the present exemplary embodiment. The CPU 201 loads the program stored in the ROM 203 into the RAM 202, and performs processing according to each of flowcharts that will be described below, by which each of these functional units is implemented. Then, a result of the execution of each of the processing procedures is stored in the RAM 202. Further, for example, in a case where hardware is used as an alternative to software processing using the CPU 201, this configuration can be also implemented by preparing a calculation unit or a circuit configured to correspond to processing of each of the functional units that will be described herein.

An imaging control unit 301 controls the camera 101 mounted on the vehicle, and causes it to chronologically capture a plurality of images at a predetermined interval (e.g., per second) while the vehicle is running. Then, in the present exemplary embodiment, the imaging control unit 301 stores the captured images into the SSD 209 and also functions as a management unit that manages each of them in association with information about a time and a position at which the image is captured. In the case of the present exemplary embodiment, the imaging control unit 301 holds a table that records therein the plurality of chronologically captured images while associating the information about the time and the position at which the image is captured with each of these images. An image information table 401 illustrated in FIG. 2 is an example of the table in which the information regarding the captured images is recorded by the imaging control unit 301. The image information table 401 includes information of an "identification (ID)", an "image file", a "time", and a "position". As the "ID", identification information for uniquely identifying the captured image is stored, and a number corresponding to an imaging order is recorded in the present exemplary embodiment. The "time" and the "position" are the information about the time at which the image is captured by the imaging control unit 301 and the camera position at this time, respectively. Information about a latitude and a longitude acquired by, for example, a Global Positioning System (GPS) sensor mounted on the camera 101, the report apparatus 102, or the vehicle itself is recorded in the "position". However, in a case where the position information acquired by the GPS sensor mounted on the report apparatus 102 or the vehicle largely deviates from the actual position of the target (subject) imaged by the camera 101, a result of adding processing for correcting a difference may be stored. Then, the period meant by the phrase "while the vehicle is running", during which automatic imaging is carried out, can be defined by determining a definition thereof at the convenience of the size of the agricultural land, the content of the work on that day, the capacity of the storage device, and the like. For example, the period meant by "while the vehicle is running" may be defined to be a period during which the vehicle is moving, or can also be defined to be a period lasting from a start to an end of predetermined work including even a time at which the vehicle is not moving or a time at which an engine thereof is stopped. In the present exemplary embodiment, this period is defined to be a period lasting from an input indicating the start of the predetermined work to an input indicating the end thereof to the report apparatus 102, including a time at which the vehicle is not moving for a work-related reason.

A report instruction unit 302 generates and records, in response to an instruction from the user, report information including a report content and a position and a time. In the present exemplary embodiment, items for specifying the report content as indicated in a display state 901 illustrated in FIG. 5A (images 902 to 904 representing buttons in this example) are displayed on a tablet terminal that is the report apparatus 102 mounted on the vehicle. To the report instruction unit 302, the user inputs the instruction by selecting the item corresponding to the content to be reported (pressing the item in this example). The report instruction unit 302 generates and records the report instruction including the report content corresponding to the selected item and the position or the time at which the report is made. The record content refers to information corresponding to a target to image (hereinafter referred to as an imaging target). In the case of the present exemplary embodiment, the user, who is the worker, targets an object appropriate for recording the discovered incident as the imaging target for the purpose of reporting this incident during the work in the agricultural land. Therefore, the report content corresponds to the purpose for capturing the image (hereinafter referred to as an imaging purpose).

Figure 5A:
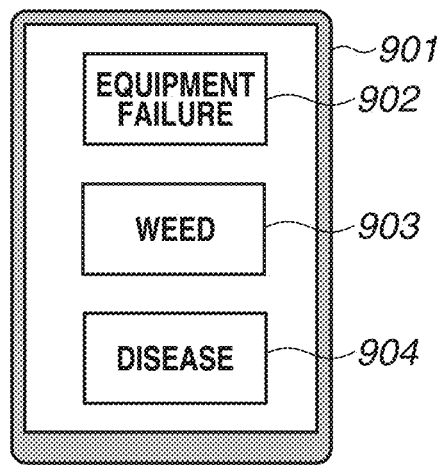
FIGS. 5A, 5B, and 5C are diagrams illustrating an example of display states on a tablet terminal serving as the management system.

In the present exemplary embodiment, three button icons, "equipment failure", "weed", and "disease" are displayed on the screen as options of the report content as indicated in the display state 901 illustrated in FIG. 5A. Each of the items is pressed to report the equipment failure, the emergence of weeds, or the occurrence of a disease of the agricultural crop. An instruction information table 501 illustrated in FIG. 2 indicates a table that is an example of the information recorded by the report instruction unit 302. The instruction information table 501 includes information of an "ID", a "report content", a "time", and a "position". The "report content" is the content that the user specifies with use of the tablet terminal illustrated in FIG. 5A, and any one of the "equipment failure", the "weed", and the "disease" is stored therein in the present exemplary embodiment. The "time" and the "position" are the information about the time and the position at which the user specifies the report content. The "position" corresponds to the position information stored by the imaging control unit 301 into the image information table 401. The position is assumed to be the position information detected by the GPS sensor mounted as a part of the input device 208 on the report apparatus 102 in the present exemplary embodiment, but the GPS sensor mounted on the camera 101 may be utilized therefor. In the case where the position information is detected with use of a GPS sensor different from the imaging control unit 301, the report apparatus 102 may, for example, add the processing for correcting the difference.

A candidate acquisition unit 304 selects an image corresponding to the report content specified by the user from the plurality of chronologically captured images. In the present exemplary embodiment, first, the candidate acquisition unit 304 selects an image associated with a position or a time close to the position or the time at which the report instruction is recorded as a candidate image group from the plurality of images based on the information stored in the image information table 401. An image identification unit 303 performs processing for detecting a predetermined object contained in the image with use of a general object detection technique with respect to each image in the candidate image group selected by the candidate acquisition unit 304. Then, the image identification unit 303 identifies the image most suitable for the specified report content in the candidate image group as a report image based on a position at which the predetermined object is detected. For example, if there is only one image containing the predetermined object in the candidate image group, this image is selected as the image most suitable for the report. If the object is detected from a plurality of images, an image in which the object is more centrally positioned is identified. The predetermined object refers to a plurality of kinds of targets predefined according to the report content. Then, a parameter management table 601 illustrated in FIG. 2 is an example of a table that manages a parameter for identifying the image. The parameter management table 601 includes information of an "ID", a "report content", and a "target". The "target" is information about the object defined as the imaging target corresponding to the report content. In the present exemplary embodiment, the image identification unit 303 identifies the predetermined object corresponding to the specified report content by referring to the parameter management table 601, and acquires a model to use in the detection processing from a predetermined storage unit.

The image identification unit 303 may identify the report image by detecting the object preferentially in the image associated with the close position or time to search for the image further suitable for the report content, without use of the candidate acquisition unit 304. Further, the object detection processing by the image identification unit 303 does not necessarily have to be performed inside the report apparatus 102. More specifically, the image identification unit 303 can also be replaced with a functional unit that transmits an address of the candidate image group and an instruction to perform the detection processing to a cloud or the like via the network 103, and acquires the report image identified as a result of the object detection processing performed by the cloud. In this case, the report processing according to the present exemplary embodiment can be smoothly performed even when the report apparatus 102 lacks sufficient resources.

A display control unit 305 performs control for displaying various kinds of images and a user interface on the display 206. In the present exemplary embodiment, the user interface screen illustrated in the display state 901 in FIG. 5A is displayed when a predetermined application is started up.

Because of limitations on the drawing, all of the items displayed as the options are illustrated as white buttons in FIG. 5A, but the buttons can be displayed in different colors from one another. Displaying only required minimum text information in this manner and further coloring the items distinguishably allow the user to understand them at a glance even in the middle of engaging in the agricultural work, thereby allowing the worker to quickly manipulate the screen. Not only the buttons but also an image currently captured by the camera 101 may be displayed on the interface of the display state 901. In this case, the worker can be further aware of, for example, dirt attached to a lens.

Figure 5B:
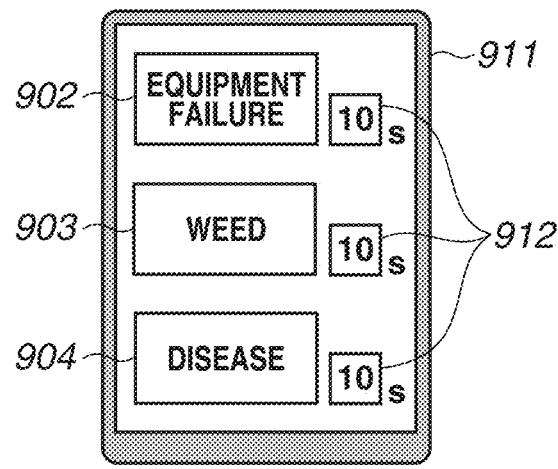
Figure 5C:
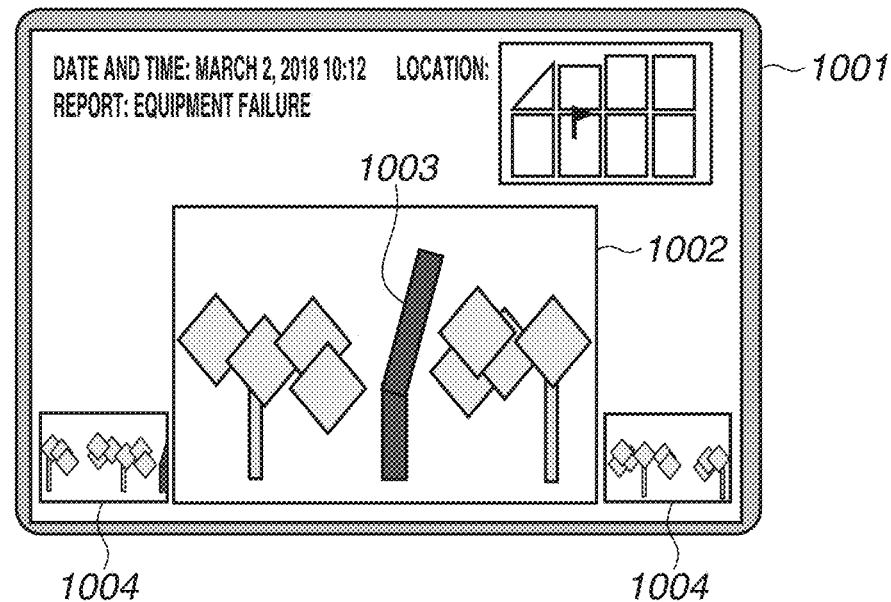

Further, the display control unit 305 displays the image identified by the image identification unit 303 on the display 206 to present it to the user. For example, a display state 1001 illustrated in FIG. 5C is an example illustrating a screen on the tablet terminal on which an image 1002 of a bent stake 1003 imaged to report that the equipment failure is discovered is displayed by the display control unit 305. Further, because there may be a little possibility that the image identification unit 303 incorrectly detects the object, the display control unit 305 may display another image 1004 in the candidate image group while changing an appearance thereof from the report image, such as displaying it in a smaller size. The display control unit 305 may allow the user to confirm another candidate image of the target (the bent stake 1003 in the present example) by checking the image 1004. Further, the display control unit 305 may display the report image distinguishably from the candidate image group by changing the appearance of the report image, such as surrounding the report image with a frame.

Figure 3:
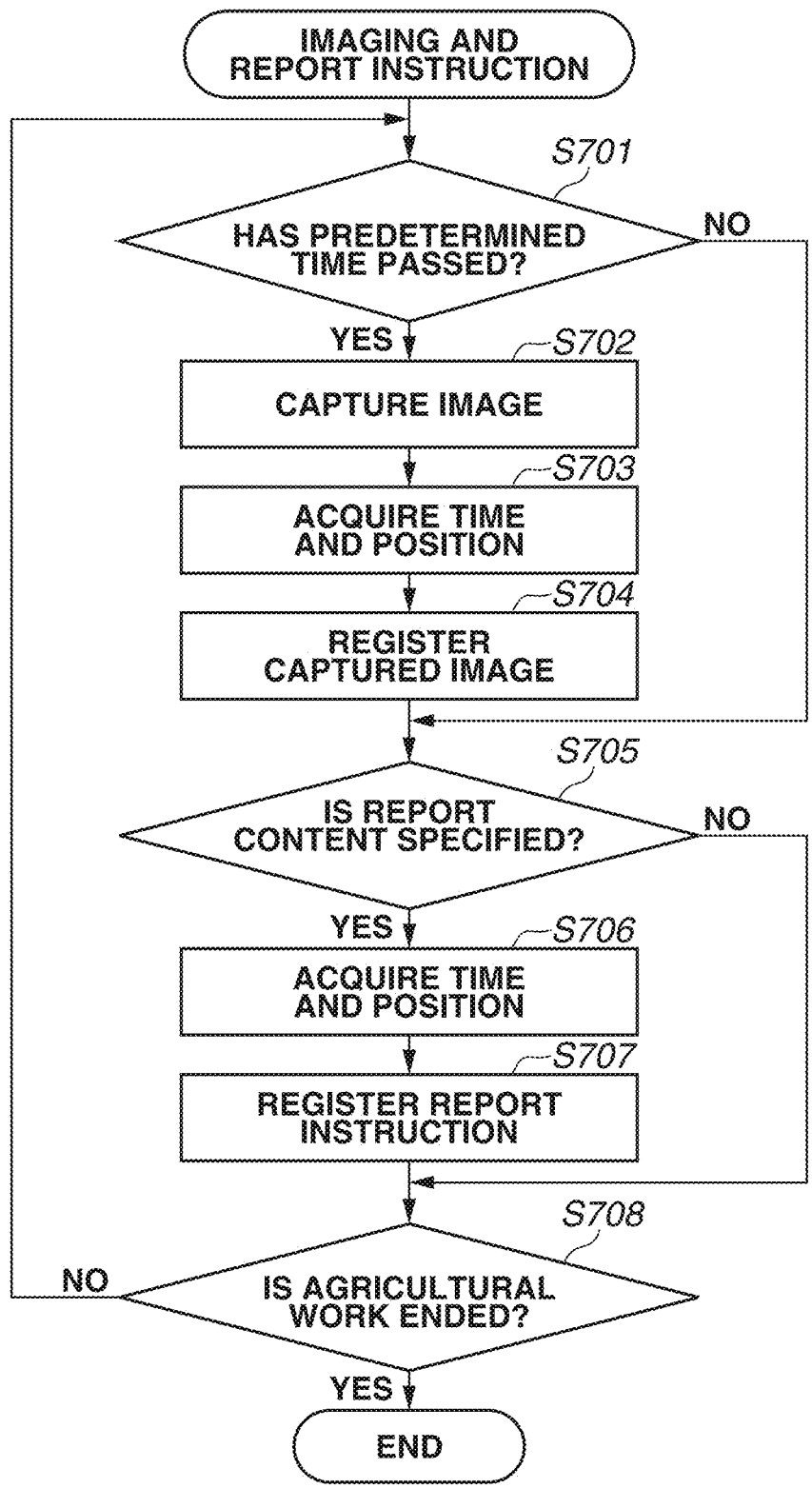
FIG. 3 is a flowchart illustrating an example of processing performed by the management system in response to a report instruction.

FIG. 3 is a flowchart illustrating an example of processing performed by the report apparatus 102 in response to the report instruction. In the present exemplary embodiment, processing of step S701 is started in response to the startup of the predetermined application and an input of an operation indicating a "work start" on the tablet terminal serving as the report apparatus 102. Processing performed in steps S701 to S704 is processing in which the imaging control unit 301 controls the camera 101 to cause it to repeatedly capture the image at the predetermined time interval. In step S701, the imaging control unit 301 determines whether a predetermined time such as one second has passed from the time at which the camera 101 has captured the image last time. If the predetermined time has not passed (NO in step S701), the processing proceeds to step S705. If the predetermined time has passed (YES in step S701), the processing proceeds to step S702. In step S702, the imaging control unit 301 captures the image by the camera 101 mounted on the vehicle. In step S703, the imaging control unit 301 acquires information about the current time and position. In step S704, the imaging control unit 301 records the captured image file and the information about the time and the position into the image information table 401.

Processing performed in steps S705 to S707 is processing in which the report instruction unit 302 receives the report instruction from the user at the time of the imaging. In step S705, the report instruction unit 302 determines whether the user specifies the report content via the tablet terminal mounted on the vehicle. In other words, the report instruction unit 302 determines whether the displayed button icon is pressed and the operation of selecting the item is input. If the report content is not specified (NO in step S705), the processing proceeds to step S708. If the report content is specified (YES in step S705), the processing proceeds to step S706. In step S706, the report instruction unit 302 acquires the information about the current time and position.

In step S707, the report instruction unit 302 records the report content and the information about the time and the position into the instruction information table 501.

In step S708, the CPU 201 determines whether the agricultural work is ended, and the processing of steps S701 to S707 is repeated (NO in step S708) until the agricultural work is ended. In the present exemplary embodiment, the CPU 201 determines the end of the agricultural work by determining whether an operation indicating the "work end" is input on the application. However, the start and the end of the work may be determined based on, for example, a startup state of the engine of the vehicle or a result of detecting that the current position of the vehicle moves in or out beyond a boundary of the range of the prerecorded agricultural land.

FIG. 4 is a flowchart illustrating an example of processing for displaying the reported image. In the present exemplary embodiment, processing in step S801 is started in response to the startup of the predetermined application and an input of an operation for confirming the report image by the user on the tablet terminal serving as the report apparatus 102. In step S801, the candidate acquisition unit 304 initializes a variable i indicating the ID of the targeted report instruction to 1. In step S802, the report instruction unit 302 acquires the report instruction identified by an ID equal to i from the instruction information table 501. In step S803, the candidate acquisition unit 304 searches the image information table 401 for an ID of an image associated with a time earlier than the time of the acquired report instruction and closest to the time of the report instruction to also take into consideration a possibility that the report instruction may be issued after the image is captured.

In the present exemplary embodiment, the image extracted as a result of the search is assumed to be an image captured within a predetermined range from the position of the vehicle when the report instruction is input. The predetermined range is determined based on the angle of view of the imaging apparatus and a speed at which the vehicle moves.

In step S804, the candidate acquisition unit 304 acquires three images in total from the searched image to the image having an ID, two IDs after the ID of the searched image, as the candidate image group. For example, assume that, when the ID of the report instruction is 1, an image having an ID set to 4 is searched from the image information table 401, and three images in total that have IDs of 4 to 6, respectively, are acquired as the candidate image group. The plurality of images is acquired as the candidate image group at this time because the timing at which the user instructs the report apparatus 102 to capture the image does not necessarily match the timing at which the predetermined target is located within the angle of view of the camera 101. Further, in the present exemplary embodiment in particular, the images captured later than the timing at which the user instructs the report apparatus 102 to capture the image are added to the candidates. As a general tendency, the camera 101 is often mounted at a position on the side of the vehicle to be placed it as close to the agricultural crop as possible, although the user is seated on a seat in the vehicle (a portion corresponding to the forefront in the structure of the vehicle). In this case, the angle of view of the camera 101 highly likely catches a scenery behind the user's field of view when the worker notices the incident that has occurred in the agricultural land and instructs the report apparatus 102 to image it. This means that the target regarding the discovered incident is imaged by the camera 101 later than the timing at which the user instructs the report apparatus 102 to image it. Therefore, in the present exemplary embodiment, the images from the image searched in step S803 to the image captured two images after this image are selected as the candidate image group. However, the criterion for determining the candidate images is not limited to this example. The definition of the image to add to the candidate image group can be set based on an actual relationship between the position at which the user is on board and the position at which the camera 101 is mounted.

In step S805, the image identification unit 303 detects the name and the position of the object contained in the image with use of the general object detection technique, such as Faster regional convolutional neural network (R-CNN), from each of the images in the candidate image group. In step S806, the image identification unit 303 acquires the target corresponding to the report content of the report instruction acquired in step S802 from the parameter management table 601, and identifies the image in which the target is detected at the position closest to the center as the report image. If the target is not detected from any of the images, the image searched in step S803 may be selected as the report image.

In step S807, the display control unit 305 displays the information about the report instruction and the report image on the display 206. The display control unit 305 may display an image acquired by cutting out a specific region centering the target from the report image. In step S808, the candidate acquisition unit 304 determines whether the report instruction identified by the ID equal to i is the last report instruction. If this report instruction is not the last report instruction (NO in step S808), the processing proceeds to step S809. In step S809, the candidate acquisition unit 304 adds 1 to i to move on to the next report instruction. Then, the processing in steps S802 to S807 is repeated.

In the present exemplary embodiment, the processing according to the flowchart illustrated in FIG. 4 is performed by the report apparatus 102 the same as the apparatus to which the report instruction is input, by way of example. However, the processing for displaying the reported image may be performed by another apparatus. For example, in a case where report apparatuses 102 mounted on a plurality of vehicles are operated in the agricultural land, the system may be configured to allow one report apparatus 102 to display images reported by the other report apparatus(es) 102. In this case, the system is configured to allow the one report apparatus 102 and the other report apparatus(es) 102 to mutually refer to the image information table 401 and the instruction information table 501 via the network IF 204. Alternatively, the system may manage each of the tables in an external storage device, thereby centrally managing the information regarding the plurality of vehicles.

In the above-described step S803, the image extracted as the result of the search is only the image captured within the predetermined range from the position of the vehicle when the report instruction is input. Using the information about the position in addition to the information about the time in this manner facilitates handling the image group targeted for the search processing even when a plurality of vehicles is used at the same time. When the plurality of vehicles is used at the same time and the images respectively reported from them are collectively managed in the image information table 401, even a plurality of images captured at times close to each other may be captured at scattered positions. In other words, there is a possibility that images for reports regarding a plurality of phenomena are mixed therein. However, provided that the system is in use under an environment in which the plurality of vehicles does not capture the images at the same position at the same time individually, an image related to the report instruction from some vehicle can be narrowed down by using the information about the imaging position. Therefore, in the present exemplary embodiment, the group of images captured within the predetermined range from the position information in the report instruction is targeted for the search. As a result, even when the plurality of vehicles is used at the same time and the images captured by them are collectively managed, the report apparatus 102 can reduce occurrence of an error in which the report contents are mixed up.

When the system does not support the plurality of vehicles, it may be useful to conduct the search with use of any one of the time and the position. In other words, when the system is in use under an environment in which a single vehicle is used and a route thereof and a time taken for the movement are controlled, the report apparatus 102 can uniquely identify the image from the imaging time and estimate the position at which this image is captured. Similarly, the report apparatus 102 can uniquely identify the image from the imaging position and estimate the information about the time at which this image is captured. Further, for the imaging time, numerical information indicating the order in which the image is captured can also be used as information equivalent to the imaging time, in a case where the system is in use in a state where the time period during which the vehicle runs and the time interval at which the image is captured are identified. In other words, the image can be searched for from a group of accumulated images based on at least information related to the time at which the image is captured (time information and information corresponding to the time information) and the information about the time at which the report instruction is input. In this case, it is sufficient that at least the information regarding the time at which each of the images is captured is managed in the image information table 401. However, managing detailed information such as the position in addition to the time at which the image is captured in the table enables the information to be quickly collected at a stage of analyzing the report content from the identified image.

In the above-described manner, according to the present exemplary embodiment, the report apparatus 102 identifies the image suitable for the purpose specified by the user at an arbitrary timing from the plurality of images captured at the predetermined interval by the camera 101 mounted on the vehicle based on the imaging time, the position, and the subject. However, the report apparatus 102 can narrow down the candidate images by using at least the information related to the time at which the image is captured, and identify the image containing the subject suitable for the purpose. The report apparatus 102 can quickly narrow down the candidate images by further using the imaging position, depending on the number of vehicles and the imaging method. In the present exemplary embodiment, the purpose specified by the user is reporting an incident, especially, a trouble discovered in the agricultural land of the agricultural crop. In the present exemplary embodiment, the user can easily specify the purpose for the report and the subject suitable for the purpose by the operation of selecting the item corresponding to the incident that the user wants to report among the plurality of displayed items. The report apparatus 102 can save time and effort for the user to search for the desired image from an enormous number of images by identifying the image in which the target defined for each incident to report is detected from the plurality of images. Further, in the present exemplary embodiment, the report apparatus 102 can identify the image in the composition further suitable for the report content even when the position and the angle of view of the camera 101 fixed on the vehicle is difficult to finely adjust, by analyzing the position in the image at which the target is detected.

The information regarding the captured image is managed by being recorded in the image information table 401 in the present exemplary embodiment, but may be recorded in exchangeable image file format (EXIF) information of the captured image instead of the table. In this case, the candidate image group is acquired by analyzing the EXIF information of each of the images. Further, the plurality of images captured as needed while the vehicle is running is assumed to be accumulated in the SSD 209 in the present exemplary embodiment, but the possibility that these images are used for the report reduces when the report instruction is not issued for a predetermined or longer time or within a predetermined or longer distance after the imaging. Therefore, the report apparatus 102 may be configured to delete the accumulated image based on the elapsed time after the imaging.

Next, a configuration in which the candidate image group is specified by the worker will be described as a modification example. In the first exemplary embodiment, when the instruction for selecting the displayed item is input (YES in step S705), the recorded position information and time information are only the information at the time when the selection instruction is issued. Then, in step S803, the candidate acquisition unit 304 searches for the plurality of images while providing ranges of time and position, to identify the candidate images based on the information about the time and the position at which the selection instruction is issued. In the modification example, the report apparatus 102 allows the user to specify that a group of images captured during a predetermined period starting from the selection instruction and defined based on the time or the position is set as the candidate image group.

The field of view of the worker on the vehicle and the angle of view of the imaging apparatus mounted on the vehicle do not necessarily match each other. Especially, the worker, who is the user, often watches in a traveling direction of the vehicle. On the other hand, the imaging apparatus tends to be mounted so as to face in a direction that is mainly the left and right directions of the vehicle rather than the traveling direction because the imaging target is seldom located in the traveling direction of the vehicle. Therefore, it is highly likely that the worker notices occurrence of some incident in the field of view placed in the traveling direction of the vehicle at a timing the same as or earlier than a timing when the imaging apparatus catches the target corresponding to this incident in the angle of view thereof. Further, the worker is in a position to be able to control the running speed of the vehicle, and therefore may be able to estimate a time taken until the visually discovered target is brought into the angle of view of the imaging apparatus and is imaged. Therefore, in the modification example, an input unit 912 is provided beside each of the items 902 to 904 in a display state 911 illustrated in FIG. 5B. The input unit 912 is used to define, by time or position, a predetermined range starting from the time or the position at which the instruction for selecting the item is issued. More specifically, a text box in which a numerical value can be input is disposed and receives an input of a notification expressed in second in the case of time or a notification expressed in meter in the case of position. For example, when "10 (s)" is set, a group of images captured in 10 seconds starting from the time at which the selection instruction is issued is identified as the candidate image group. Then, this image group is targeted for the object detection processing performed by the image identification unit 303 in step S805. The report apparatus 102 may be configured to allow the worker to switch whether to employ second (s) or meter (m) as the unit with a pull-down menu or the like.

In the modification example, the acquisition of the candidate image group specified by the user may replace the processing in steps S803 and S804 in the flowchart illustrated in FIG. 4, but may also be carried out in parallel or in series with them. In the case where both of the processing procedures are performed, the time and the position based on which the image is searched for in step S803 are arranged so as to contain an outside of the boundary of the range set by the user. In this case, the report apparatus 102 can treat even an image failed to be imaged within the range set by the user as a candidate for the report image, thereby compensating for a difference between the user's feeling and the actual imaging situation, if any.

In the first exemplary embodiment, the system has been described assuming that one camera is mounted on one vehicle. On the other hand, a second exemplary embodiment will be described referring to an example of a system capable of imaging a further wide range by including upper left, lower left, upper right, and lower right cameras, four cameras in total mounted on one vehicle. In the following description, the second exemplary embodiment will be described omitting descriptions of components shared with the first exemplary embodiment as needed and focusing on differences from the first exemplary embodiment.

Figure 6:
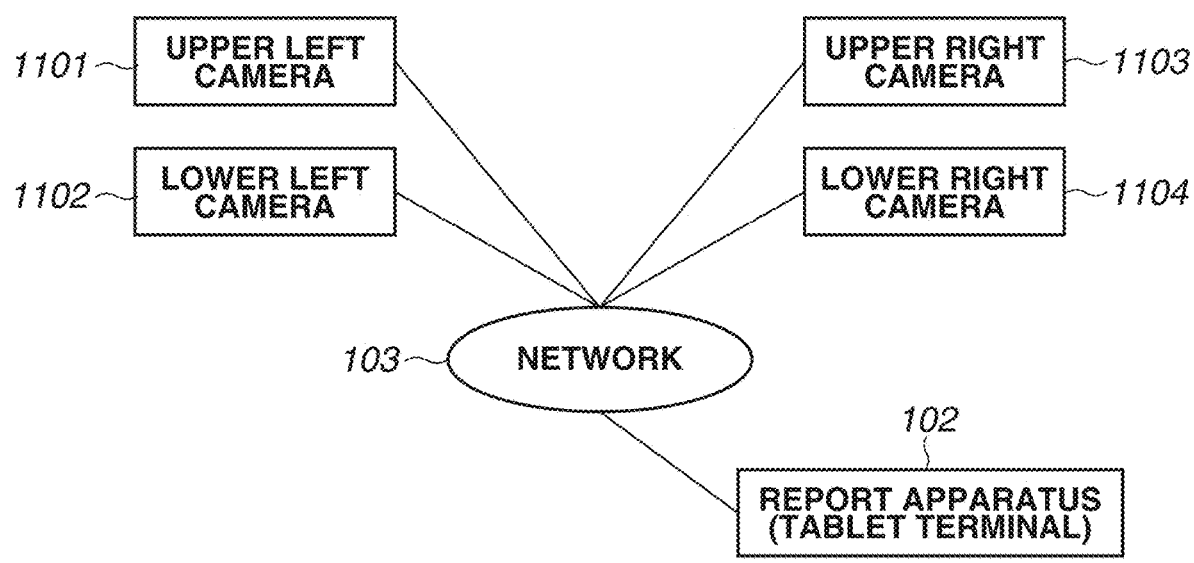
FIG. 6 is a block diagram illustrating an example of a configuration of a management system connected to four cameras located on upper left, lower left, upper right, and lower right sides.

FIG. 6 illustrates a system configuration according to the second exemplary embodiment. This system configuration is different from that in FIG. 1A in terms of four upper left, lower left, upper right, and lower right cameras 1101 to 1104 replacing the camera 101, which are connectable with the report apparatus 102. The information processing apparatus functioning as the report apparatus 102 has a similar hardware configuration and functional configuration to the first exemplary embodiment. However, in the second exemplary embodiment, the imaging control unit 301 manages an image information table equivalent to the image information table 401 in association with each of the four upper left, lower left, upper right, and lower right cameras 1101 to 1104.

Figure 10:
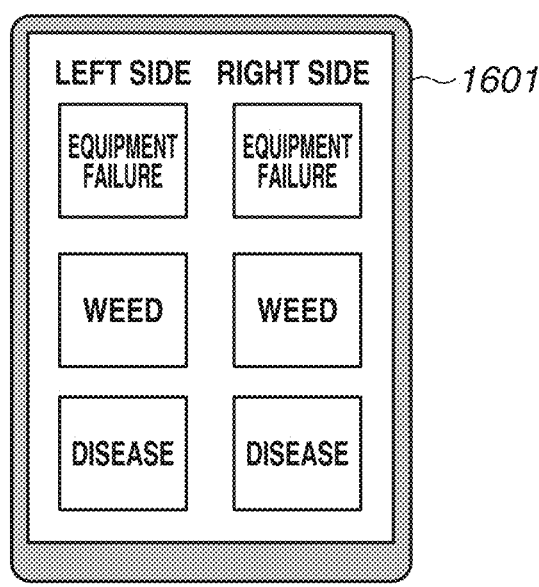
FIG. 10 is a diagram illustrating an example of a display state on the tablet terminal serving as the management system.

Further, in the present exemplary embodiment, a display state 1601 illustrated in FIG. 10 is presented as the user interface displayed by the display control unit 305 on the display 206 instead of the display state 901 illustrated in FIG. 5A. In the display state 1601, the user interface is presented as a screen in which two items corresponding to the same target are displayed in a state of being horizontally arranged as illustrated in FIG. 10. Such a user interface allows the user to specify which side the user makes the report about, the left side or the right side of the user. In the present exemplary embodiment, the independent imaging apparatuses are mounted on the left side and the right side of the vehicle, respectively. Therefore, while the vehicle is running once along a passage in the agricultural land, both the sides of the passage are imaged at the same time. The user (the worker) selectively uses the left column and the right column of the plurality of buttons displayed in the display state 1601 between when the worker notices the occurrence of the incident that should be reported on the right side and when the worker notices the occurrence of the incident that should be reported on the left side while riding in the vehicle. The user can intuitively manipulate them due to the corresponding arrangement between the layout of the buttons and the left side and the right side of the vehicle. The button icons in the two columns are displayed in correspondence with the two left and right imaging directions in the present example as one example, but the present configuration can also handle even further more directions. For example, imaging apparatuses that capture images in front and rear directions are further mounted on each of the left side and the right side of the vehicle, and the report apparatus 102 displays a button icon corresponding to the same report instruction in each of four display regions laid out in correspondence with the individual imaging directions. The report apparatus 102 allows the user to intuitively manipulate them even in the middle of the agricultural work by arranging the plurality of display regions positioned in correspondence with the plurality of imaging directions and displaying the set of the plurality of items in each of the display regions in this manner.

Further, an instruction information table 1201 illustrated in FIG. 7 corresponds to the instruction information table 501, and indicates an example of the information recorded by the report instruction unit 302. Information indicating the left or right direction information, which specifies whether the incident to report has occurred on the left side or the right side of the vehicle, is recorded in the instruction information table 1201 in addition to the ID, the report content, the time, and the position, which are the items in the instruction information table 501. Further, a parameter management table 1301 illustrated in FIG. 7 corresponds to the parameter management table 601 illustrated in FIG. 2, and additionally stores therein information about an "upper/lower direction", which indicates whether to use the captured image on the upper side or the lower side according to the report content. In this case, the upper and lower cameras are selectively used to facilitate imaging of the image in a further desirable composition in which the target can be most easily confirmed, for example, in a composition that places the ground at the center in the case of the weed, and in a composition that places a leaf or a fruit at the center in the case of the disease of the agricultural crop.

Figure 8:
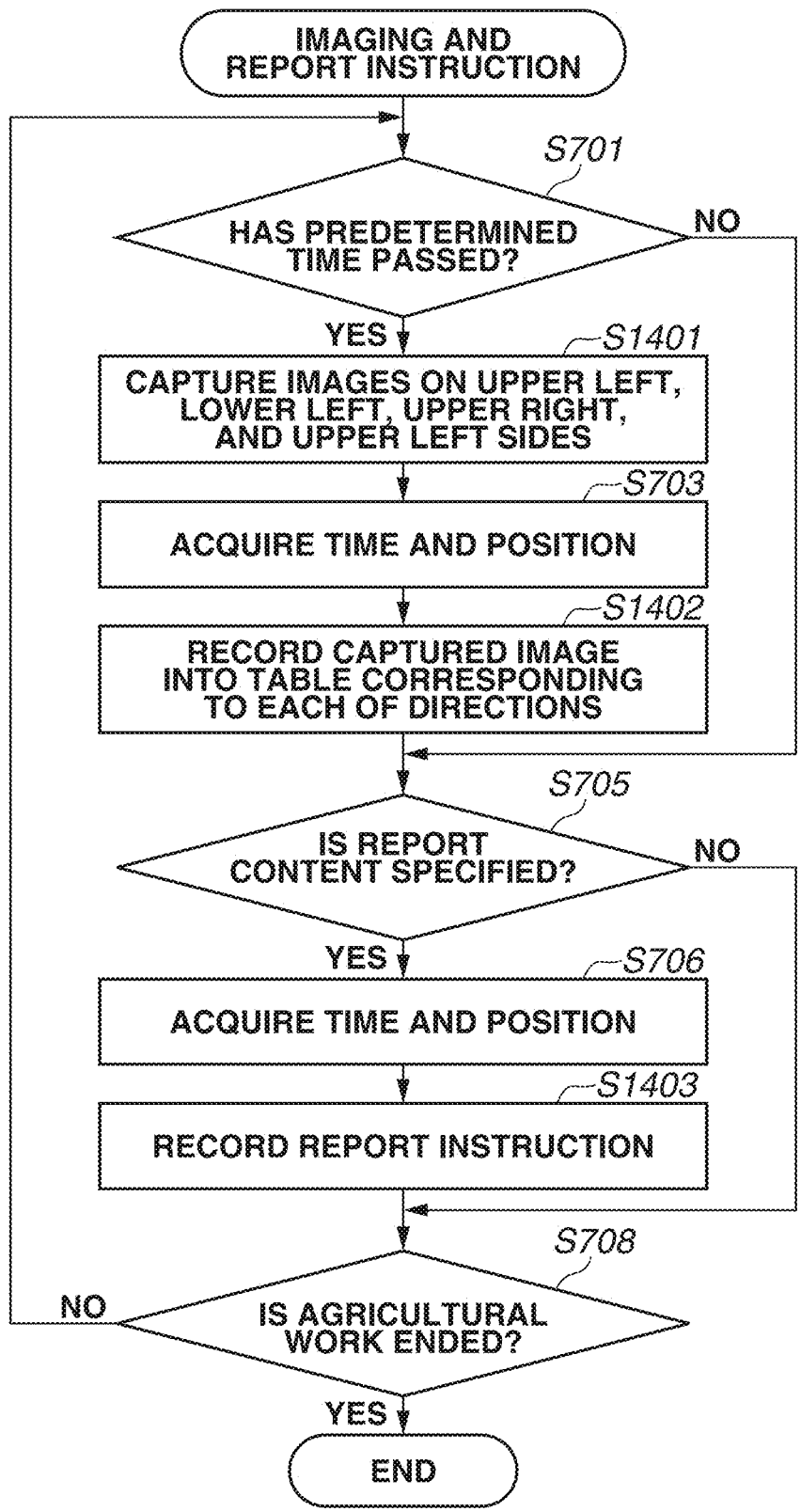
FIG. 8 is a flowchart illustrating an example of processing performed by the management system in response to the report instruction.

FIG. 8 is a flowchart illustrating an example of processing in response to the report instruction that is performed by the report apparatus 102. This flowchart will be described assigning the same step numbers to the steps the same as those in the flowchart illustrated in FIG. 3 described in the first exemplary embodiment, and omitting detailed descriptions thereof. In the present exemplary embodiment, if the imaging control unit 301 determines that the predetermined time has passed in step S701 (YES in step S701), the processing proceeds to step S1401. In step S1401, the imaging control unit 301 controls the four upper left, lower left, upper right, and lower right cameras 1101 to 1104 mounted on the vehicle to cause them to capture the images. In step S1402, the imaging control unit 301 records the captured image file and the information about the time and the position into the image information table corresponding to each of the four cameras 1101 to 1104 that is prepared for each camera in each of the directions in advance. In step S1403, the report instruction unit 302 records the information about the direction specified on the tablet terminal that indicates whether the problem is reported as a problem on the left side or a problem on the right side into the instruction information table 1201 in addition to the report content, the time, and the position.

Figure 9:
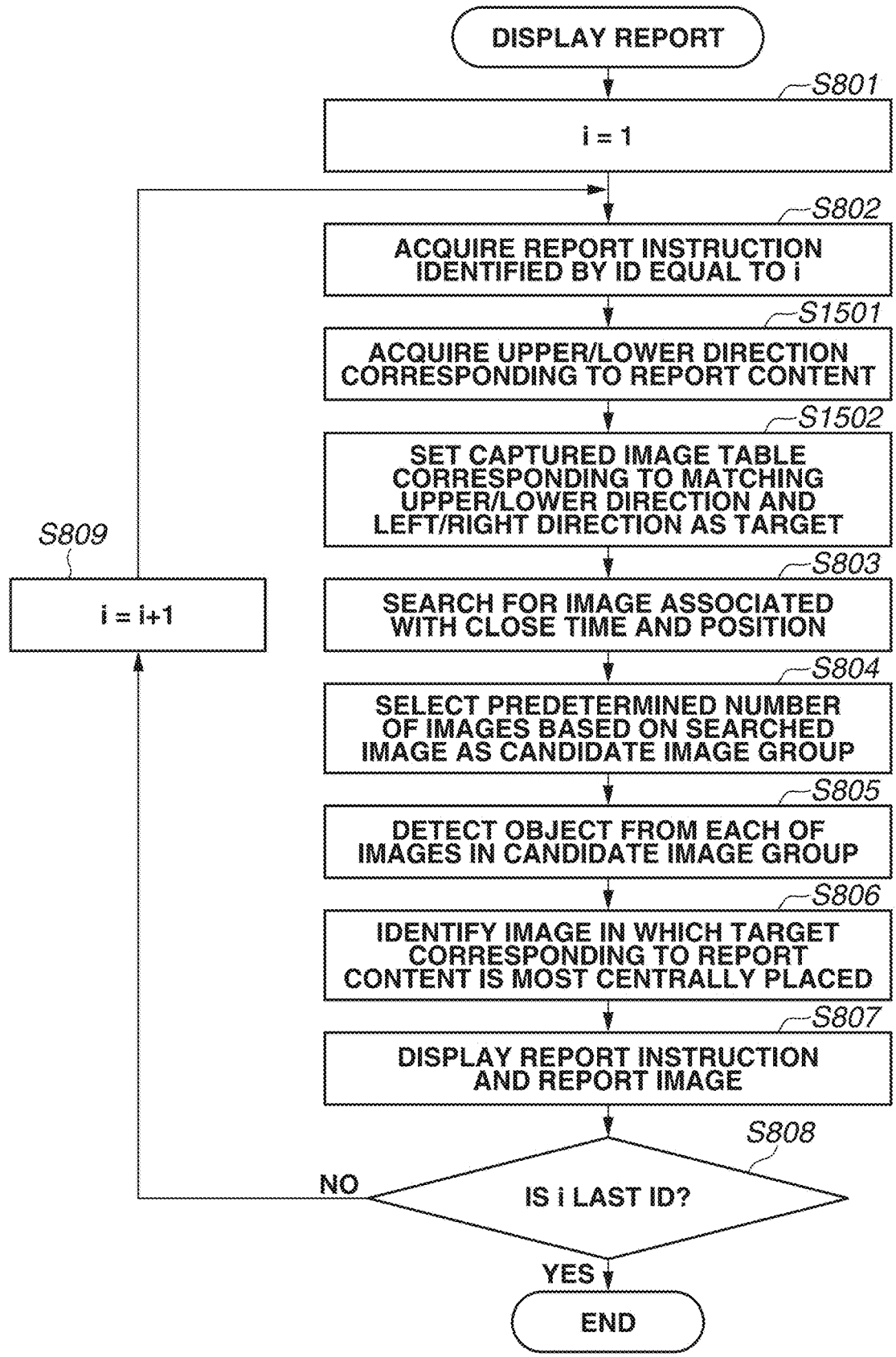
FIG. 9 is a flowchart illustrating an example of processing for displaying the image performed by the management system in response to the instruction.

FIG. 9 is a flowchart illustrating an example of processing for displaying the image in response to the instruction that is performed by the report apparatus 102. In the present exemplary embodiment, in step S802 the same one as that in the flowchart illustrated in FIG. 4 described in the first exemplary embodiment, the report instruction unit 302 also acquires the report instruction identified by the ID equal to i (a record 1 in the table 1201). Then, in step S1501, the candidate acquisition unit 304 acquires the upper or lower direction corresponding to the report content from the acquired report instruction. In step S1502, the candidate acquisition unit 304 identifies the camera among the four captured image management tables based on the information about the left or right direction contained in the report instruction and the information about the upper or lower direction predefined for the report content, and sets the image information table associated with the camera as a processing target. After that, similar processing to FIG. 4 is performed with respect to the image information table that is the set processing target.

As described above, according to the present exemplary embodiment, the report apparatus 102 can identify the further suitable image from the images captured in a further wide range to use it for the report by determining the targeted direction based on the report instruction from the images captured by the plurality of cameras mounted in the plurality of directions.

Further, according to the present exemplary embodiment, the image suitable to the purpose specified by the user at an arbitrary timing can be acquired from the plurality of images captured at the predetermined interval by the plurality of cameras mounted on the vehicle so as to face in the plurality of directions. In terms of the acquired image, using the plurality of cameras allows a wide range to be imaged by one run compared to when a single camera is used, thereby reducing a possibility of unintentional omission of imaging the imaging target. Further, this configuration brings about an effect of facilitating the acquisition of the image in which the target is placed in a further appropriate composition because the cameras can be mounted so as to face in the plurality of directions where the imaging target would be located, such as the ground and a branch of a tree, respectively.

Regarding the image identification unit 303, the candidate acquisition unit 304, and the like among the above-described individual processing units, the processing thereof may be performed with use of a machine-learned learned model instead of them. In this case, for example, a plurality of combinations of input data and output data to and from the processing unit is prepared as learning data, and knowledge is obtained based on machine learning from them. Then, the learned model is created so as to output the output data with respect to the input data as a result based on the obtained knowledge. The input data serving as the learning data is the plurality of images chronologically captured by the camera(s) mounted on the vehicle, and the output data is the candidate image group extracted from them or the image for the report that is specified by the worker. The learned model can be configured as, for example, a neural network model. Then, this learned model performs the processing of the above-described processing unit by operating in collaboration with the CPU, a graphics processing unit (GPU), and the like as a program for performing processing equivalent to the above-described processing unit. The above-described learned model may be updated after predetermined processing as necessary.

The present invention can be implemented as an embodiment in the form of, for example, a system, an apparatus, a method, a program, or a recording medium (a storage medium). More specifically, the present invention may be applied to a system including a plurality of devices (e.g., a host computer, an interface device, an imaging device, a web application), or may also be applied to an apparatus including one device.

The present invention can also be embodied by processing in which a program capable of realizing one or more functions of the above-described exemplary embodiments is supplied to a system or an apparatus via a network or a storage medium, and causes one or more processors in a computer of this system or apparatus to read out and execute the program. Further, the present invention can also be embodied by a circuit (e.g., an application specific integrated circuit (ASIC)) capable of realizing one or more functions.

According to the present invention, the image suitable to the instruction to image the target that the user issues at the arbitrary timing can be acquired by the camera mounted on the moving object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-242176, filed Dec. 26, 2018, which is hereby incorporated by reference herein in its entirety.

What is claimed is:

1. An information processing apparatus comprising:
one or more processors that implement:
a management unit configured to manage a plurality of images chronologically captured by an imaging apparatus mounted on a moving object, each image of the plurality of images being associated with information that indicates a respective time at which the image was captured;
a display control unit configured to display, on a display device, a plurality of items, wherein each item of the plurality of items corresponds to a respective target of a plurality of kinds of predefined targets, and the display control unit being configured to display the plurality of items on the display device while the imaging apparatus captures images of the plurality of images;
an acquisition unit configured to acquire, in a case where an instruction based on a selection of any of the plurality of displayed items is input in the information processing apparatus while the imaging apparatus captures the images of the plurality of images, a candidate image group from the plurality of images, based on the information that indicates the respective times at which each image of the plurality of images was captured and on information that indicates a time at which the instruction was input, wherein the candidate image group includes two or more images; and
an identification unit configured to identify an image containing the target that corresponds to a selected item from the candidate image group.

2. The information processing apparatus according to claim 1, wherein the display control unit displays, on the display device, the image identified by the identification unit.

3. The information processing apparatus according to claim 2, wherein, among the plurality of images, the two or more images in the candidate image group were captured at times close to the time at which the instruction was input.

4. The information processing apparatus according to claim 3, wherein the identification unit identifies the image containing the target based on respective positions, in each of the two or more images, at which the target that corresponds to the selected item is detected, and
wherein the target that corresponds to the selected item is detected as a result of performing processing for detecting the target that corresponds to the selected item on each of the two or more images in the candidate image group.

5. The information processing apparatus according to claim 4, wherein the identification unit identifies, as the image containing the target, an image of the two or more images in which the target that corresponds to the selected item is detected at a position closest to a center of the image.

6. The information processing apparatus according to claim 4, wherein, in a case where the target corresponding to the selected item is not detected from each of the plural images in the candidate image group, the identification unit acquires at least one image in the candidate image group based on information regarding any one of a position and the times at which each of the two or more images in the candidate image group were captured.

7. The information processing apparatus according to claim 3, wherein the display control unit is configured to display an image contained in the candidate image group on the display device together with the image identified by the identification unit.

8. The information processing apparatus according to claim 7, wherein the display control unit differentiates an appearance of an image that is not the image identified by the identification unit among the two or more images contained in the candidate image group from the image that is identified by the identification unit.

9. The information processing apparatus according to claim 1,
wherein each image of the plurality of images is associated with information that indicates a respective position at which the image was captured, and
wherein the acquisition unit acquires the candidate image group from the plurality of images based on (i) information regarding a position of the moving object or a position of the imaging apparatus when the instruction based on the selection of any of the plurality of displayed items was input into the information processing apparatus, (ii) the information that indicates the time at which the instruction was input, and (iii) the selected item.

10. The information processing apparatus according to claim 9,
wherein the information processing apparatus is configured to move together with the moving object, and
each of the two or more images in the candidate image group was captured at (i) a respective position close to the position of the moving object or (ii) the position of the imaging apparatus when the instruction was input and was captured at a time close to the time at which the instruction was input.

11. The information processing apparatus according to claim 10, wherein the two or more images in the candidate image group were captured by respective imaging apparatuses mounted on each of a plurality of moving objects.

12. The information processing apparatus according to claim 1,
wherein the plurality of items displayed by the display control unit are images representing a plurality of buttons forming a user interface, and
wherein the plurality of buttons are displayed in different colors from one another.

13. The information processing apparatus according to claim 1,
wherein the plurality of items displayed by the display control unit includes at least two items that correspond to the same target among the plurality of kinds of predefined targets and that are displayed in a state where the two items are arranged on a left side and a right side, and
wherein the identification unit identifies the image containing the target that corresponds to the selected item from images chronologically captured by one or more imaging apparatuses, among a plurality of imaging apparatuses mounted independently from one another on a left side and a right side of the moving object, that are determined according to which item of the two items is selected in the selection.

14. The information processing apparatus according to claim 13, wherein the plurality of imaging apparatuses are mounted so as to face in at least four directions of upper, lower, left, and right sides of the moving object.

15. The information processing apparatus according to claim 1,
wherein the moving object is a vehicle for use in agricultural work, and
wherein the plurality of kinds of predefined targets includes at least a target imaged to record any of an equipment failure, emergence of a weed, and occurrence of a disease of an agricultural crop in an agricultural land where the agricultural crop is cultivated.

16. A method for controlling an information processing apparatus, the method comprising:
managing a plurality of images chronologically captured by an imaging apparatus mounted on a moving object, each image of the plurality of images being associated with information that indicates a respective time at which the image was captured;
displaying, on a display device, a plurality of items while the imaging apparatus captures images of the plurality of images, wherein each item of the plurality of items corresponds to a respective target of a plurality of kinds of predefined targets; and
identifying an image containing the target that corresponds to a selected item among the plurality of images based on (i) information that indicates a position of the moving object or a position of the imaging apparatus when an instruction based on a selection of the selected item that is input, into the information processing apparatus, while the imaging apparatus is moving, (ii) the information regarding a time at which the instruction is input, and (iii) the selected item.

17. A non-transitory computer-readable storage medium storing a program causing a computer to perform a method for controlling an information processing apparatus, the method comprising:
managing a plurality of images, chronologically captured by an imaging apparatus mounted on a moving object, each image of the plurality of images being associated with information that indicates a respective position and a respective time at which the image was captured;
displaying, on a display device, a plurality of items, wherein each item of the plurality of items corresponds to a respective target of a plurality of kinds of predefined targets, and displaying the plurality of items on the display device while the imaging apparatus captures images of the plurality of images;
acquiring, in a case where an instruction based on a selection of any of the plurality of displayed items is input in the information processing apparatus while the imaging apparatus captures the images of the plurality of images, a candidate image group from the plurality of images, based on the information that indicates the respective times at which each image of the plurality of images was captured and on information that indicates a time at which the instruction was input, wherein the candidate image group includes two or more images; and
identifying an image containing the target that corresponds to a selected item from the candidate image group.

18. An information processing system comprising:
a moving object provided with one or more imaging apparatuses;
a report apparatus corresponding to the moving object; and
one or more processors that implement:
a management unit configured to manage a plurality of images chronologically captured by the one or more imaging apparatuses mounted on the moving object, each image of the plurality of images being associated with information that indicates a respective time at which the image was captured;
a display control unit configured to display, on a display device, a plurality of items, wherein each item of the plurality of items corresponds to a respective target of a plurality of kinds of predefined targets, and the display control unit being configured to display the plurality of items on the display device while the one or more imaging apparatuses capture images of the plurality of images;

an acquisition unit configured to acquire, in a case where an instruction based on a selection of any of the plurality of displayed items is input in the information processing system while the imaging apparatus captures the images of the plurality of images, a candidate image group from the plurality of images, based on the information that indicates the respective times at which each image of the plurality of images was captured and on information that indicates a time at which the instruction was input, wherein the candidate image group includes two or more images; and an identification unit configured to identify an image containing the target that corresponds to a selected item from the candidate image group.

19. The information processing system according to claim 18, wherein the one or more imaging apparatuses include a plurality of imaging apparatuses that are mounted on the moving object so as to face in a plurality of imaging directions, and wherein the display control unit displays a set of the plurality of items corresponding to the plurality of kinds of predefined targets at each of positions respectively corresponding to the plurality of imaging directions in an image displayed on the display device.

20. The information processing system according to claim 18, further comprising a plurality of the moving objects, wherein the two or more images in the candidate image group were each captured at a respective position close to a position at which the instruction was input and at a time close to the time at which the instruction was input.

* * * * *